United States Patent
Cacace-Bailey et al.

(10) Patent No.: US 6,611,916 B1
(45) Date of Patent: Aug. 26, 2003

(54) METHOD OF AUTHENTICATING MEMBERSHIP FOR PROVIDING ACCESS TO A SECURE ENVIRONMENT BY AUTHENTICATING MEMBERSHIP TO AN ASSOCIATED SECURE ENVIRONMENT

(75) Inventors: Melissa Cacace-Bailey, North Haven; Andrei Obrea, Wilton; Rebecca E. Carvell, Brookfield; David P. Gardner, Southbury; Jeffrey Pierce, Norwalk, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/213,547

(22) Filed: Dec. 17, 1998

(51) Int. Cl.[7] .............................. G06F 12/14; H04L 9/00
(52) U.S. Cl. ........................................... 713/201; 380/5
(58) Field of Search ................................ 713/200, 201, 713/202; 380/3, 5

(56) References Cited

U.S. PATENT DOCUMENTS

| | | | |
|---|---|---|---|
| 5,390,251 A | | 2/1995 | Pastor et al. ................... 380/21 |
| 5,455,953 A | * | 10/1995 | Russell ........................ 395/739 |
| 5,764,890 A | * | 6/1998 | Glasser et al. ......... 395/188.01 |
| 6,243,816 B1 | * | 6/2001 | Fang et al. ................. 713/202 |
| 6,275,824 B1 | * | 8/2001 | O'Flaherty et al. ............ 707/9 |
| 2001/0016819 A1 | * | 8/2001 | Kolls ............................ 705/1 |
| 2001/0021928 A1 | * | 9/2001 | Ludwig et al. ............... 705/67 |

* cited by examiner

*Primary Examiner*—Norman M. Wright
(74) *Attorney, Agent, or Firm*—Alberta A. Vitale; Charles R. Malandra, Jr.; Angelo N. Chaclas

(57) ABSTRACT

The present invention provides a way to access a secure environment by virtue of a right to access another secure environment. The present invention is directed to, in a general aspect, a method of authenticating membership for providing access to a secure environment. The environment for which access is requested can be a network environment, such as, for example, an Internet, containing a first secure domain and a second secure domain. Network connections can be made using TCP/IP protocols. Claimants inside and outside of the first secure environment are afforded access to the second secure environment. The first secure environment uses its own authentication information, such as a database of user names and passwords, for authenticating claimants. In order for an outside claimant to gain access to the second secure environment, the outside claimant must have previously been an inside claimant. When the inside claimant accesses the second secure environment, the server of the second secure environment stores location information on the claimant's computer. The method allows for authentication of claimants for providing access to several secure environments based on access to a first secure environment.

14 Claims, 3 Drawing Sheets

METHOD OF AUTHENTICATING MEMBERSHIP FOR PROVIDING ACCESS TO A SECURE ENVIRONMENT BY AUTHENTICATING MEMBERSHIP TO AN ASSOCIATED SECURE ENVIRONMENT

FIELD OF THE INVENTION

The invention disclosed herein relates generally to membership verification and, more particularly to a method of verifying membership in order to access a secure environment.

BACKGROUND OF THE INVENTION

In a typical situation, when a user wants access to a secure environment, the user exchanges information such as a user name and password with that secure environment. When the user wants access to another secure environment, the user would exchange other information, such as another user name and password, with that secure environment. An example of this scenario is where several users, each access secure environment A and secure environment B by exchange of information known to each user and to each secure environment. In this situation, prior to authentication of the user, the user is known as the claimant or party presenting an identity and claiming to be a principal. The principal is a legitimate owner of an identity. The secure environments are known as verifiers or parties that gain confidence that the claimant's claim is legitimate.

Claimants can be authenticated using a variety of methods. Generally, there are three types or levels of authentication based on information shared with a claimant. Each of the three levels provides a different level of security. The three levels of authentication are based upon 1) "what a claimant knows", such as, for example, a user name and password; 2) "what a claimant has," such as, for example, a cryptographic token or a smart card with secret information; and 3) "what a claimant is", such as, for example, biometrics information including fingerprints and retinal prints. Each of these levels or types of authentication require that the claimant and the verifier know the information that is being used for authentication purposes.

Access to secure environments can be set up so that security requires claimants and verifiers each to know information that will be used for authentication. These shared knowledge security systems can be based upon, for example, user name and password, and user locations, etc. Administration of the shared knowledge is costly, difficult and impractical for systems with many users. For example, many large corporations have thousands of users of their computer systems. In a system using user name and password, a data base of thousands of user names and passwords must be stored and maintained. Some systems use address-based security which authenticates a claimant based on the originating address of the claimant, such as for example, the Internet Protocol Address of the claimant's server. The problem with these systems is that the claimant frequently changes addresses and the system is costly and administratively difficult to manage. Another problem with the address-based system is that, even if the claimants do not change addresses, the number of addresses that need to be maintained could be, for a large company, too difficult and costly to manage. Another problem with the address-based system is that it is unable to provide a means of access for a mobile user, such as, for example a mobile worker.

Not only is the shared information administratively difficult and costly for the administrator of the secure environment to maintain, the information can also be cumbersome for the user to remember. This is because each user must remember information for each secure environment. In addition to being cumbersome, the situation might compromise the security of the passwords. For example, a user might write down the password in an attempt to remember it. The password could then be obtained (from the user's written note) by an unauthorized person.

Secure environments can be secure domains such as interconnected networks. For example, a company intranet which is an interconnected collection of networks can be a secure domain. Secure domains can be interconnected by networks, such as for example, the Internet. Multiple secure domains connected to the Internet is an example of a situation where a user would need access to multiple secure domains in order to obtain services provided by those domains. Each secure domain may require some common information for authentication purposes. Thus, the situations described above are applicable to the authentication of an Internet service claimant.

In the Internet example, there are scenarios where providing access to a secure domain by use of authentication information is cumbersome and/or administratively difficult. For example, in one scenario, if a user after gaining access to a secure domain, remembers a particular URL in that domain, by use of, for example, a browser bookmark and the user would like to later gain access to that URL, the user will not be able to access the secure domain without first providing the user's authentication information. In another scenario, if the user would like to access another secure domain, the user will not be able to access the secure domain without first providing the user's authentication information associated with that secure domain. In yet another scenario, if secure domain A and secure domain B are associated in such a way that the administrator of secure domain A wants users of secure domain A to gain access to secure domain B or some subset of secure domain B, access to both domains would not be available without the administrative burden of maintaining a database of user authentication information at each secure domain.

Thus, one of the problems of the prior art is that providing access to a secure environment requires that the verifier know particular information about each claimant. Another problem of the prior art is that providing access to a secure environment requires that the verifier know particular information about the claimant's address. Another problem of the prior art is that information shared between the claimant and the verifier is administratively difficult and impractical to gather and maintain for a system with, for example, thousands of claimants seeking access to the secure domain. Another problem of the prior art is that access to a URL at a secure domain requires verification of the claimant each time the URL is accessed. Another problem of the prior art is that associated secure domains each need verification information.

SUMMARY OF THE INVENTION

This invention overcomes the disadvantages of the prior art by providing a way to access a secure environment by first accessing another secure environment. The present invention is directed to, in a general aspect, a method of authenticating membership for providing access to a secure environment. The environment for which access is requested can be a network environment, such as, for example, an Internet, containing a first secure domain and a second secure domain. Network connections can be made using TCP/IP protocols (Transmission Control Protocol/Internet Protocol). Claimants inside and outside of the first secure environment are afforded access to the second secure environment, or portion thereof, by virtue of being authenticated into the first secure environment. Also, specific information can be obtained based on the knowledge that claimants have access to the first secure environment. The first secure environment uses its own authentication information, such as a database of user names and passwords, for authenticating claimants. In order for an outside claimant to gain access to the second secure environment, the outside claimant must have previously been an inside claimant that used the first secure environment and accessed to second secure environment while using the first secure environment. When the inside claimant accesses the second secure environment, the second secure environment server stores location information with the claimant's computer. That information can be a cookie containing first secure environment's URL. The cookie can be stored on the claimant's computer. The information is updated each time the claimant accesses the second secure environment from inside the first secure environment. Thus, if the first secure environment location information has changed, the information stored with the claimant will be updated.

When the claimant moves outside the first secure environment and tries to access the second secure environment directly, the second secure environment server reads the first secure environment location information from the claimant's computer and sends the claimant to the first secure environment where the claimant must provide authentication information to the first secure environment server. Once the outside claimant has gained access to the first secure environment, the outside claimant is given origin authentication information, such as, a digital signature, and the claimant is sent to the second secure environment server. Then, the second secure environment verifies the digital signature and allows the claimant access to information in the second secure environment. The claimant, upon verification, is a principal. The method allows the second secure environment administrator to "piggyback" on the first secure environment's security and avoid administrative inconveniences of implementing its own security. Thus, the second secure environment security is then, only as good as the security provided by the first secure environment.

Thus, an advantage of the method of the present invention is that it does not require the second secure environment to maintain verification information. Another advantage of the present invention is that authentication information is less costly to maintain. Another advantage of the present invention is that authentication information is less cumbersome to administer. Another advantage of the present invention is that claimants do not need multiple verification information to access associated secure environments. Another advantage of the present invention is that it provides a way to authenticate large groups of users with less administration. Other advantages of the invention will in part be obvious and will in part be apparent from the specification. The aforementioned advantages are illustrative of the advantages of the various embodiments of the present invention.

DETAILED DESCRIPTION OF THE PRESENT INVENTION

Figure 1A:
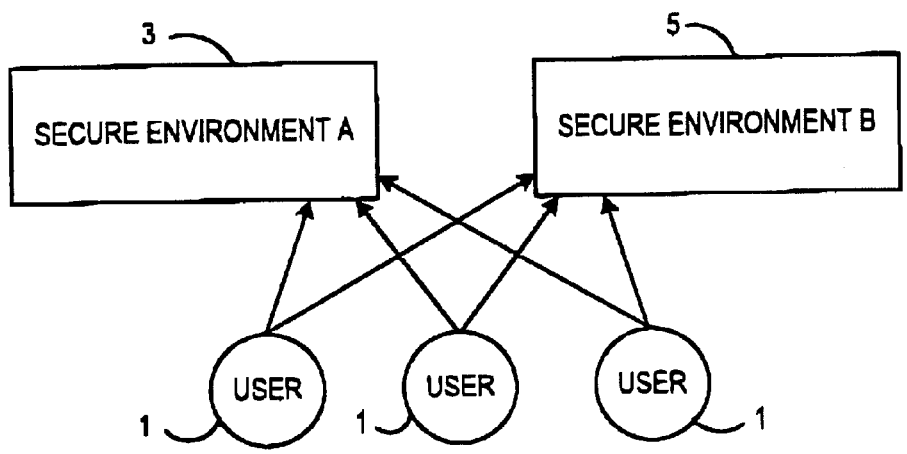
FIG. 1a illustrates several users accessing secure environments by a prior art method, each accessing secure environment A and secure environment B by exchange of information known to each user and to each secure environment.

FIG. 1a illustrates several users 1 accessing secure environments A and B by a prior art method, each accessing secure environment A and secure environment B by exchange of information known to each user 1 and to each secure environment 3, 5. Each of three users 1 must remember a set of information needed in order to gain access to each secure environment 3, 5. If a user 1 needs access to many secure environments, the user must remember information for each environment. In addition to being cumbersome, the situation might compromise the security of the passwords. For example, a user might write down the passwords in an attempt to remember them. The passwords could be obtained by an unauthorized person.

In describing present invention, reference will be made herein to FIGS. 1b, 2 and 3 of the drawings in which like numerals refer to like features of the present invention.

Figure 1B:
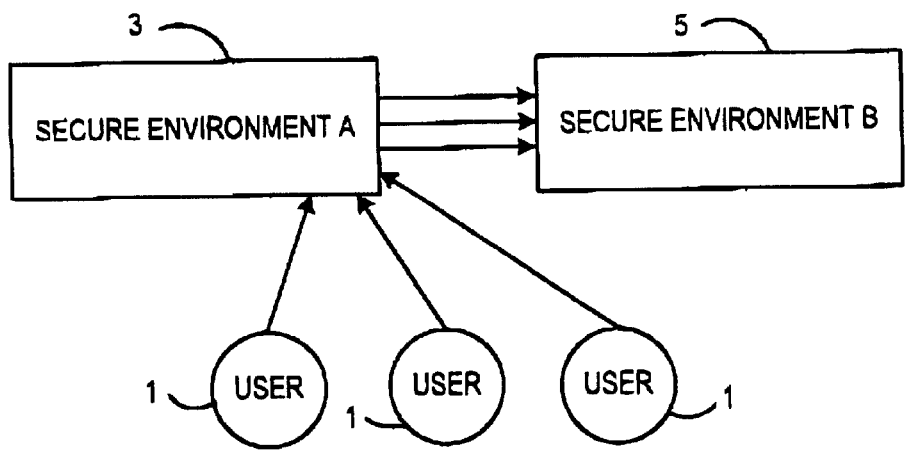
FIG. 1b illustrates how access to secure environment B is afforded users of the present method. Several users access the first secure environment, secure environment A and based upon authentication for access to environment A, the users are sent to the second secure environment, secure environment B.

FIG. 1b illustrates how access to secure environment B is afforded users 1 of the present method. Several users 1 access the first secure environment, secure environment A and based upon authentication for access to environment A, the users are sent to the second secure environment, secure environment B, 5. Thus, the need for user 1 specific authentication information at secure environment B is not needed. The user 1 is provided access to secure environment B based on membership in secure environment A.

Figure 2:
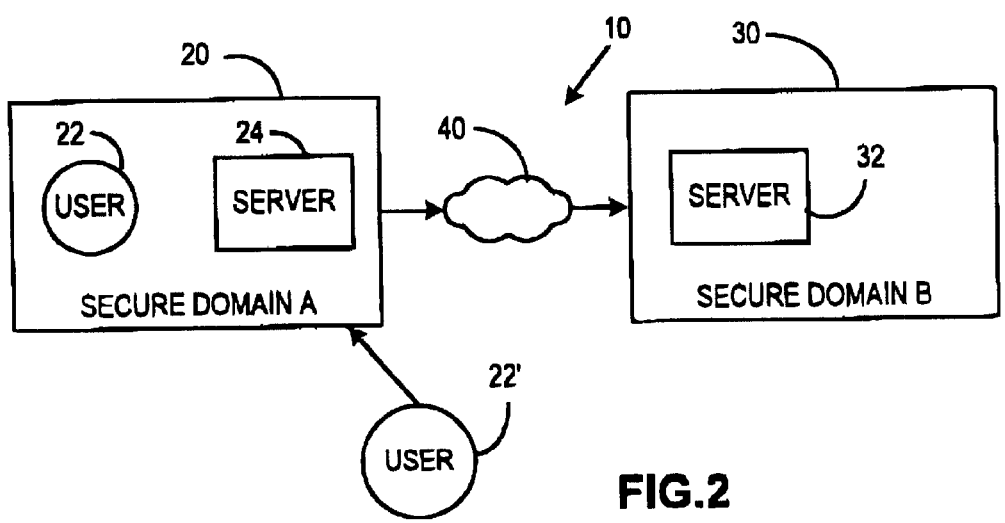
FIG. 2 illustrates a network configuration block diagram on which an embodiment of the method of the present invention can be performed.

FIG. 2 illustrates a network configuration 10 block diagram on which an embodiment of the method of the present invention can be performed. The network can be an Internet with a first secure domain, secure domain A, and a second secure domain, secure domain B. The first secure domain 20 and the second secure domain 30 are interconnected through a network 40 such as, for example, an Internet using TCP/IP protocols. An inside user 22 accesses the first secure domain 20 through a server (not shown) inside the first secure domain. The user can become an outside user 22' by moving outside the first secure domain 20 and accessing the first secure domain 20 from a server outside the first secure domain 20. The first secure domain 20 comprises a server 24 that can be networked with other servers (not shown) within the first secure domain 20. The second secure domain 30 comprises a server 32 that can be networked with other servers within the second secure domain 30.

In one embodiment of the present invention, the method enables the outside user 22' access to the second secure domain 30 by verifying the outside users 22' membership in the first secure domain 20. The inside user 22 is allowed access to the second secure domain 30 by virtue of the inside user's 22 position in the first secure domain. In order for an outside user 22' to gain access to the second secure domain 30, the outside user 22' must have, at a time prior to being outside the first secure domain 20, been inside the first secure domain 20 and accessed the second secure domain. Access could have been obtained by, for example, using a mouse and clicking on a hypertext link containing a URL of the second secure domain 30 and located on the first secure domain server's 24 home page (not shown). Once access to the second secure domain 30 is obtained, the second secure domain server 32 writes information comprising the first secure domain's URL to the user's 22' computer (not shown). This information could be, for example, stored in a cookie.

Figure 3A:
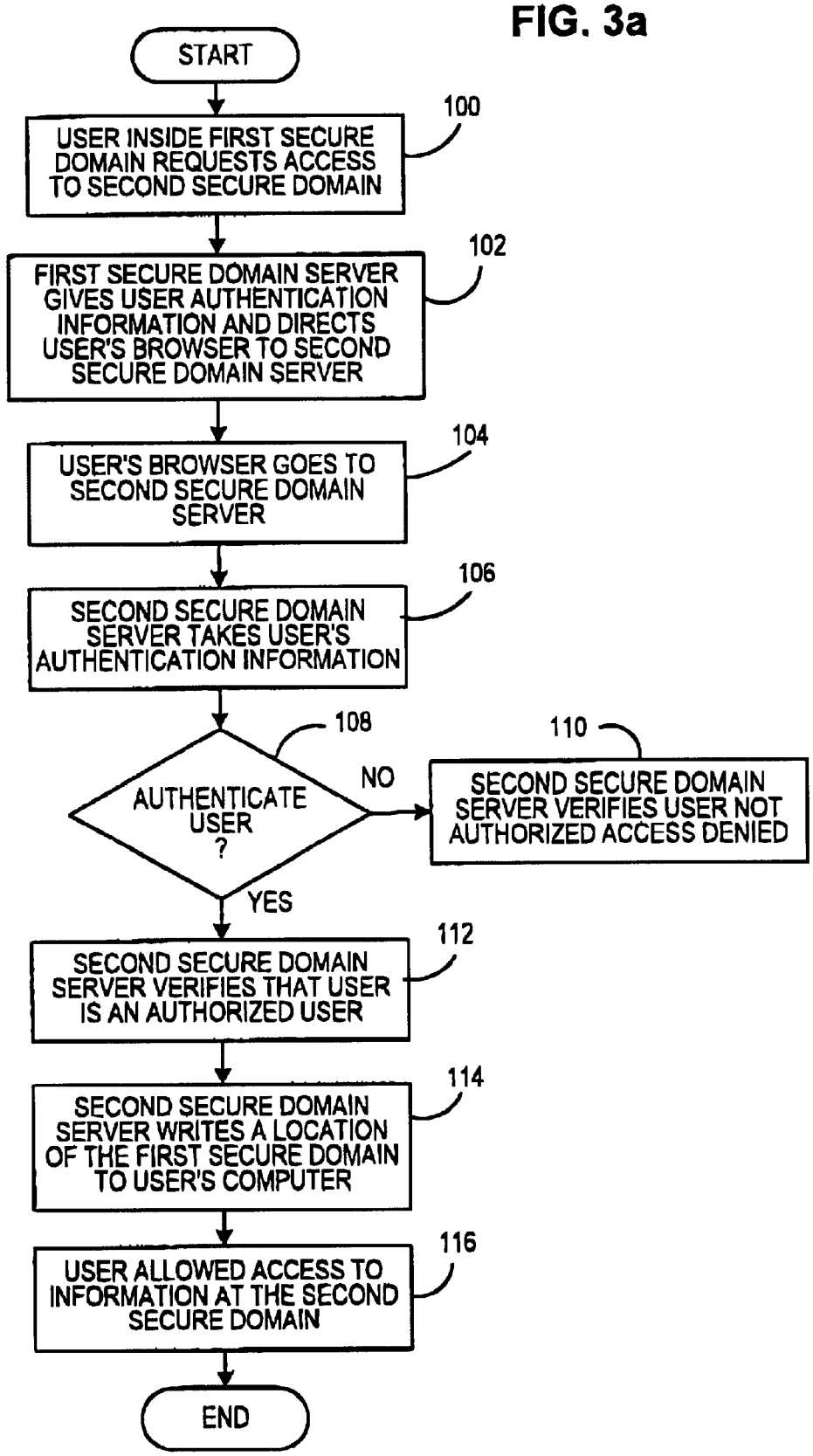
FIG. 3a is a flowchart illustrating a method of authenticating membership of a user inside a first secure domain for providing access to information on a second secure domain.
Figure 3B:
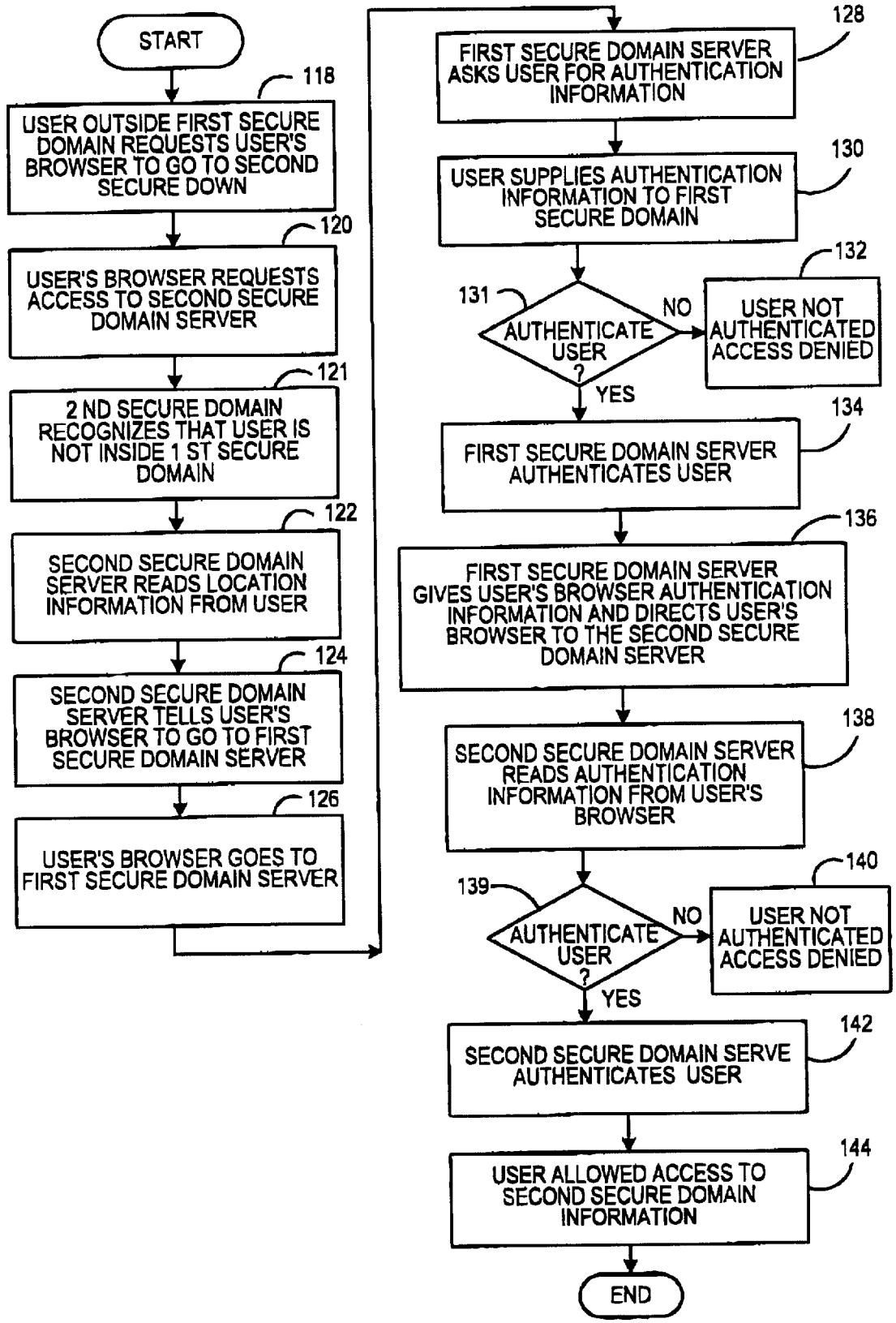
FIG. 3b is a flowchart illustrating a method of authenticating membership of a user outside a first secure domain for providing access to information on a second secure domain.

The flow charts of FIGS. 3a and 3b illustrates embodiments of the method of the present invention. FIG. 3a is a flowchart illustrating a method of authenticating membership of the user inside the first secure domain for providing access to information on the second secure domain. At step 100, the inside user 22 requests access to the second secure domain 30. At step 102, the first secure domain server 24, which can be, for example, an intranet application server, gives the inside user authentication information such as, for example a MAC or a digital signature, and directs the inside user's browser (not shown) to the second secure domain 20. At step 104, the user's browser goes to the location of the second secure domain server 32. The location can be, for example, a URL. At step 106, the second secure domain server 32 retrieves the user's authentication information from the user's browser and at step 108 attempts to authenticate the user. If authentication is unsuccessful, at step 110, access is denied. If authentication is successful, at step 112 access is authorized. At step 114, the second secure server 32 writes information, such as, for example, a cookie (not shown), containing the first secure domain's location, to the user's computer. The location could be, for example, a URL. It should be noted that a cookie is a piece of information sent by a server to a browser that the browser is expected to save and to send back to the same server whenever the server requests it. The location information can be encrypted. The location information will be used when the user later leaves the first secure domain 20 and tries to gain access to the second secure domain 30 directly. At step 116, the user is allowed access to information at the second secure domain 20.

FIG. 3b is a flowchart illustrating a method of authenticating membership of the user outside the first secure domain for providing access to information on the second secure domain. After the user has left the first secure domain 30 and becomes an outside user 22', the outside user, at step 118, requests the browser to go to the second secure domain 20 by directing the browser to the second secure domain 30 location such as, for example, a URL. The address could have been previously stored, for example, as a bookmark or hypertext link on the user's desktop on the user's computer. At step 120, the user's browser requests access to the second secure domain server 32. At step 121, the second secure domain 30 recognizes that the user is not within the first secure domain 20. This is recognized because the outside user does not have authentication information that is generated by the first secure domain server 24 each time access to the second secure domain 30 is requested. At step 122, the second secure domain server 34 reads the location information from the user's computer and obtains the location of the first secure domain server 24. If the location information is encrypted, the second secure domain server 32 decrypts the location information. At step 124, the second secure domain server 32 tells the user's browser to go to the first secure domain server location. At step 126, the user's browser goes to the first secure domain server location. At step 128, the first secure domain server 24 requests authentication information from the user 22'. At step 130, the user provides authentication information required for access to the first secure domain 20 and at step 131 a query is made to authenticate the user. If the authentication information is not correct, at step 132, access is denied. If the authentication information is correct, at step 134, access is granted. At step 136, the first secure domain server 24 gives the user's browser authentication information such as a MAC or a digital signature and directs the user's browser to the second secure domain server 32 location. The second secure domain server is the server that the user requested access to at step 118. At step 138, the second secure domain server 32 reads the authentication information from the user's browser and at step 139 a query is made to authenticate the user. If the authentication information is not authenticated, at step 140, access is denied. If the authentication information is authenticated, at step 142, access is granted. At step 144, the user is allowed access to information in the second secure domain 30. That information could be specific to the user. While the exemplary method illustrates access provided to one. One of ordinary skill in the art would recognize that multiple users could also use the method to access the secure domains. Additionally, the second secure domain 30 could have different user specific information for each user of for groups of users.

The digital signature can be truncated Message Authentication Codes (MACs) and each MAC can be generated by a separate secret key or a single secret key can be used for all MACs. If a public key cryptographic system is preferred, then a digital signature is generated instead of a MAC. Digital signature algorithms and MACs are explained in Handbook of Applied Cryptography by A. Menezes, P. Van Oorshoot and S. Vanstone, CRC Press, 1997. In the preferred embodiment, a single key is used to generate the Message Authentication Code which is truncated. Additionally, two or more secret keys may be used to generate the MACs. One key could be controlled by the first secure domain administrator and the other key controlled by second secure domain administrator. The idea of employing two separate secret keys is well known and is explained in U.S. Pat. No. 5,390,251 for a mail processing system including data center verification for mailpieces.

While the present invention has been disclosed and described with reference to a single embodiment thereof, it will be apparent, as noted above that variations and modifications may be made therein. It is also noted that the present invention is not limited to providing access to Internet domains. It is, thus, intended in the following claims to cover each variation and modification that falls within the true spirit and scope of the present invention.

We claim:

1. A method of allowing access of a user to secure computer environments comprising the steps of:
   a. authenticating the user's right to access a first secure environment; and
   b. using the user's right to enter the first secure environment to permit the user to enter a second secure environment.

2. The method claimed in claim 1 wherein the first secure environment is a network.

3. The method claimed in claim 1 wherein the second secure environment is a network.

4. The method claimed in claim 1 wherein the first secure environment is a secure domain and the second secure environment is another secure domain.

5. The method claimed in claim 1 wherein the first and second secure environments are interconnected by an Internet.

6. A method of authenticating membership of a claimant outside a first secure environment for providing the claimant access to a second secure environment comprising the steps of:
   a. providing location information to a claimant, the location information comprising information regarding the location of the first secure environment;
   b. requesting access to the second secure environment;
   c. reading location information to obtain the location of the first secure environment;
   d. directing the claimant to the first secure environment;
   e. providing authentication information to the first secure environment;
   f. verifying the claimant;
   g. accessing the first secure environment;
   h. providing additional authentication information to the claimant for authentication at the second secure environment;
   i. directing the claimant to the second secure environment;
   j. authenticating the claimant at the second secure environment; and
   k. providing access to the second secure environment.

7. The method claimed in claim 6 wherein in step (a) providing the location information is performed by the following steps:
   a. providing authentication information to the claimant while the claimant is inside the first secure environment;
   b. directing the claimant to the second secure environment;
   c. directing the claimant to the second secure environment,
   d. authenticating the claimant at the second secure environment; and
   e. using the second secure environment to give location information of the first secure environment to the claimant.

8. The method claimed in claim 6 wherein step (j) authentication is performed by performing a comparison of the claimant's authentication information with authentication information in the second secure environment.

9. The method claimed in claim 6 wherein the first secure environment is a secure domain and the second secure environment is another secure domain.

10. The method claimed in claim 6 wherein in step (a) the location information is a Uniform Resource Locator.

11. The method claimed in claim 6 where in step (a) the location information is provided in a cookie.

12. The method claimed in claim 6 wherein the first secure environment is a network.

13. The method claimed in claim 6 wherein the second secure environment is a network.

14. The method claimed in claim 6 wherein the first and second secure environments are interconnected by an Internet.

* * * * *